(12) United States Patent
Cesare et al.

(10) Patent No.: US 6,604,095 B1
(45) Date of Patent: Aug. 5, 2003

(54) METHOD, SYSTEM, PROGRAM, AND DATA STRUCTURE FOR PIVOTING COLUMNS IN A DATABASE TABLE

(75) Inventors: Mark Anthony Cesare, San Francisco, CA (US); Julie Ann Jerves, Saratoga, CA (US); Richard Henry Mandel, III, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,057

(22) Filed: Sep. 21, 1999

(51) Int. Cl.$^7$ ................................................ G06F 17/30
(52) U.S. Cl. ............................ 707/1; 707/4; 707/104.1
(58) Field of Search ......................... 707/1, 4, 10, 104.1

(56) References Cited

U.S. PATENT DOCUMENTS

| | | | |
|---|---|---|---|
| 4,876,733 A | 10/1989 | Lavin | 382/205 |
| 4,930,071 A | 5/1990 | Tou et al. | 707/4 |
| 5,196,924 A | 3/1993 | Lumelsky et al. | 348/67 |
| 5,282,147 A | 1/1994 | Goetz et al. | 716/2 |
| 5,299,304 A | 3/1994 | Williams et al. | 707/523 |
| 5,321,797 A | 6/1994 | Morton | 345/604 |
| 5,367,675 A | 11/1994 | Cheng et al. | 707/2 |
| 5,548,749 A | 8/1996 | Kroenke et al. | 707/102 |
| 5,548,754 A | 8/1996 | Pirahesh et al. | 707/2 |
| 5,548,755 A | 8/1996 | Leung et al. | 707/2 |
| 5,548,758 A | 8/1996 | Pirahesh et al. | 707/2 |
| 5,560,005 A | 9/1996 | Hoover et al. | 707/10 |
| 5,584,024 A | 12/1996 | Schwartz | 707/4 |
| 5,588,150 A | 12/1996 | Lin et al. | 707/1 |
| 5,590,321 A | 12/1996 | Lin et al. | 549/349 |
| 5,590,324 A | 12/1996 | Leung et al. | 707/5 |
| 5,598,559 A | 1/1997 | Chaudhuri | 707/2 |
| 5,615,361 A | 3/1997 | Leung et al. | 707/3 |
| 5,687,362 A | 11/1997 | Bhargava et al. | 707/2 |
| 5,694,591 A | 12/1997 | Du et al. | 707/2 |
| 5,701,454 A | 12/1997 | Bhargava et al. | 707/2 |
| 5,724,570 A | 3/1998 | Zeller et al. | 707/3 |
| 5,724,575 A | 3/1998 | Hoover et al. | 727/10 |
| 5,737,592 A | 4/1998 | Nguyen et al. | 707/4 |
| 5,742,806 A | 4/1998 | Reiner et al. | 707/3 |
| 5,905,982 A | 5/1999 | Carey et al. | 707/4 |
| 6,014,670 A | * 1/2000 | Zamanian et al. | 707/101 |
| 6,122,644 A | * 9/2000 | Graefe et al. | 707/202 |
| 6,298,342 B1 | * 10/2001 | Graefe et al. | 707/4 |

FOREIGN PATENT DOCUMENTS

| | | |
|---|---|---|
| JP | 7182179 | 7/1995 |
| JP | 7244603 | 9/1995 |
| JP | 8241330 | 9/1996 |
| JP | 9179882 | 7/1997 |
| WO | 9636003 | 11/1996 |

OTHER PUBLICATIONS

International Business Machines Corporation, IBM's Data Mining Technology, White Paper; Data Management Solutions,(c) 1996.

(List continued on next page.)

Primary Examiner—Hosain T. Alam
Assistant Examiner—Jean Bolte Fleurantin
(74) Attorney, Agent, or Firm—David W. Victor; Konrad, Raynes, Victor & Mann

(57) ABSTRACT

Disclosed is a method, system, program, and data structure for transforming at least one column in a database input table. An input data table has multiple columns and rows. A determination is made of multiple data column names and multiple pivot columns in the input table. A row is generated in an output table for each data column name, having one data column name field including one data column name and at least one pivot column field including the value in one pivot column field in the input table, wherein each of the rows in the output table for each data column name has different values in at least one of the data column name field and pivot column field.

32 Claims, 9 Drawing Sheets

OTHER PUBLICATIONS

International Business Machines Corporation, IBM Visual Warehouse for Windows NT, Managing Visual Warehouse, (c) 1998.

IBM Technical Disclosure Bulletin, Efficient Logging of Transactions on Persistent Information tin General and Data bases in Particular, vol. 40,No. 11, Nov. 1997 (c) 1997; pp. 117–120.

IBM Technical Disclosure Bulletin, Transformation of an Entity–Relationship Model into a System Object Model, Nov., 1994, pp. 631–634.

IBM Technical Disclosure Bulletin, Branch Set Preserving Transformations of Hierarchical Data Structure, vol. 23, No. 7B, Dec. 1980, (c) 1980; pp. 3090–3094.

IBM Technical Disclosure Bulletin, Intelligent Miner, vol. 40, No. 02, Feb., 1997; pp. 121–125.

* cited by examiner

202

| DATE | LOCATION | CRAFT | PASSENGER | CARGO |
|---|---|---|---|---|
| DATE | VARCHAR (10) | VARCHAR (10) | INTEGER | INTEGER |
| 1/1/2010 | EARTH | SOLARDRIVE | 56 | 45 |
| 1/1/2010 | EARTH | SUBWARP | 97 | 81 |
| 1/1/2010 | EARTH | WARP | 140 | 137 |
| 1/1/2010 | EARTH | TIMEWARP | 155 | 133 |
| 1/1/2010 | MOON | SOLARDRIVE | 78 | 156 |
| 1/1/2010 | MOON | SUBWARP | 125 | 77 |
| 1/1/2010 | MOON | WARP | 56 | 89 |
| 1/1/2010 | MOON | TIMEWARP | 179 | 44 |
| 1/8/2010 | EARTH | SOLARDRIVE | 85 | 87 |
| 1/8/2010 | EARTH | SUBWARP | 55 | 91 |
| 1/8/2010 | EARTH | WARP | 21 | 156 |
| 1/8/2010 | EARTH | TIMEWARP | 33 | 144 |
| 1/8/2010 | MOON | SOLARDRIVE | 54 | 96 |
| 1/8/2010 | MOON | SUBWARP | 122 | 77 |
| 1/8/2010 | MOON | WARP | 25 | 43 |
| 1/8/2010 | MOON | TIMEWARP | 85 | 31 |
| 1/15/2010 | EARTH | SOLARDRIVE | 24 | 74 |
| 1/15/2010 | EARTH | SUBWARP | 81 | 144 |
| 1/15/2010 | EARTH | WARP | 89 | 255 |
| 1/15/2010 | EARTH | TIMEWARP | 52 | 22 |
| 1/15/2010 | MOON | SOLARDRIVE | 52 | 152 |
| 1/15/2010 | MOON | SUBWARP | 87 | 34 |
| 1/15/2010 | MOON | WARP | 81 | 69 |
| 1/15/2010 | MOON | TIMEWARP | 144 | 64 |

| DATE | STACY | ROGER | ELIZABETH | FRANK |
|---|---|---|---|---|
| DATE | INTEGER | INTEGER | INTEGER | INTEGER |
| 1/1/98 | 1235 | - | - | 2743 |
| 1/2/98 | 1258 | 2250 | - | 982 |
| 1/3/98 | 1493 | 2491 | 3495 | 4017 |

222 ─▶

| ORDER | DATE | CASHIER | VALUE |
|---|---|---|---|
| INTEGER | DATE | VARCHAR (1) | INTEGER |
| 1 | 1/1/98 | STACY | 1235 |
| 2 | 1/1/98 | ROGER | - |
| 3 | 1/1/98 | ELIZABETH | - |
| 4 | 1/1/98 | FRANK | 2743 |
| 5 | 1/2/98 | STACY | 1258 |
| 6 | 1/2/98 | ROGER | 2250 |
| 7 | 1/2/98 | ELIZABETH | - |
| 8 | 1/2/98 | FRANK | 982 |
| 9 | 1/3/98 | STACY | 1493 |
| 10 | 1/3/98 | ROGER | 2491 |
| 11 | 1/3/98 | ELIZABETH | 3495 |
| 12 | 1/3/98 | FRANK | 4017 |

FIG. 7

METHOD, SYSTEM, PROGRAM, AND DATA STRUCTURE FOR PIVOTING COLUMNS IN A DATABASE TABLE

CROSS-REFERENCE TO RELATED APPLICATIONS

This application is related to the following co-pending and commonly-assigned patent applications, all of which are filed on the same date herewith, and which are incorporated herein by reference in their entirety:

"Method, System, Program, And Data Structure for Transforming Database Tables," to Mark A. Cesare, Tom R. Christopher, Julie A. Jerves, Richard H. Mandel III, and having U.S. application Ser. No. 09/400,507;

"Method, System, Program, and Data Structure for Cleaning a Database Table," to Mark A. Cesare, Tom R. Christopher, Julie A. Jerves, Richard H. Mandel III, and having U.S. application Ser. No. 09/399,694;

"Method, System, and Program for Inverting Columns in a Database Table," to Mark A. Cesare, Julie A. Jerves, and Richard H. Mandel III, and having U.S. application Ser. No. 09/400,690; and "Method, System, Program, And Data Structure For Cleaning a Database Table Using a Look-up Table," Mark A. Cesare, Julie A. Jerves, and Richard H. Mandel III, and having U.S. application Ser. No. 09/401,006.

BACKGROUND OF THE INVENTION

1. Field of the Invention

The present invention relates to a method, system, program, and data structure for pivoting column fields in a database table and, in particular, pivoting fields in multiple columns of an input table into fewer fields in an output table.

2. Description of the Related Art

Data records in a computer database are maintained in tables, which are a collection of rows all having the same columns. Each column maintains information on a particular type of data for the data records which comprise the rows. A data warehouse is a large scale database including millions or billions of records defining business or other types of transactions or activities. Data warehouses contain a wide variety of data that present a coherent picture of business or organizational conditions over time. Various data analysis and mining tools are provided with the data warehouse to allow users to effectively analyze, manage and access large-scale databases to support management decision making. Data mining is the process of extracting valid and previously unknown information from large databases and using it to make crucial business decisions. In many real-world domains such as marketing analysis, financial analysis, fraud detection, etc, information extraction requires the cooperative use of several data mining operations and techniques. Further details of data warehousing and data transforms, are described in the IBM publications "Managing Visual Warehouse, Version 3.1," IBM document no. GC26-8822-01 (IBM Copyright, January, 1998), which is incorporated herein by reference in its entirety.

Once the desired database tables have been selected and the data to be mined has been identified, transformations on the data may be necessary. In particular, many database tables may not have an optimal design for executing SQL queries. Many database programs, such as the IBM DB2 Universal Database program, provide numerous column functions, also referred to as set or aggregate functions. Column functions operate on a set of values (a column) and reduces a set of values in one or more columns from one or more rows to a single scalar value. Some column functions that perform operations on the rows in a column include average, count, maximum, minimum, standard deviation, sum, variance, etc. These column functions are particularly useful for performing statistical and other analysis on data in a column.

When an enterprise receives data in a spreadsheet or database format, the data may not be arranged in a table/column row format that is suited for application of column functions and other column based analysis, which is one of the more efficient types of SQL data analysis. For instance, data that the user may want to group together for applying column functions and other analysis may be spread out across different columns.

Thus, there is a need in the art for a method and system for transforming database tables in a manner that makes them more efficient to perform analysis.

SUMMARY OF THE PREFERRED EMBODIMENTS

To overcome the limitations in the prior art described above, preferred embodiments disclose a a method, system, and program for transforming at least one column in an input table. An input data table has multiple columns and rows. A determination is made of multiple data column names and multiple pivot columns in the input table: A row is generated in an output table for each data column name, having one data column name field including one data column name and at least one pivot column field including the value in one pivot column field in the input table, wherein each of the rows in the output table for each data column name has different values in at least one of the data column name field and pivot column field.

In further embodiments, each pivot column field in one row in the input table is copied to one pivot column field in one row in the output table. This causes the transfer of multiple pivot column fields in the input table to one pivot column in field in multiple rows in the output table.

In still further embodiments, for each pivot column field in the input table there is one row in the output table having one data column name field and pivot column field including the pivot column name and corresponding pivot column value in the input table, respectively.

In yet further embodiments, determining multiple pivot columns in the input table comprises determining at least one pivot group including at least one pivot column in the input table. In such case generating the at least one pivot column field in the output table row comprises generating a pivot group column in the output table row for each pivot group. Each pivot group column in the output table includes a value in one of the pivot column fields in the corresponding pivot group in the input table. This aggregates the input table pivot columns into one pivot group in one pivot group column in the output table.

Preferred embodiments provide a program for transforming aggregates of multiple column fields in an input table to multiple rows in one column of an output table. The preferred embodiments are particularly useful in situations where a database user wants to perform column functions, such as averaging, summing, maximum, standard deviation, etc., on values in fields that are spread over multiple columns of one or more rows. The SQL code needed to apply common column functions to fields spread across columns and rows could be quite cumbersome. Preferred embodiments pivot aggregates of fields dispersed through multiple columns and rows in an input table to fewer columns in an output table. By pivoting fields from multiple columns into a single column in the output table, typical database column function could be applied to the rows in the single column. This would allow the user to apply basic and straightforward SQL commands and column functions to perform the analysis of the fields.

BRIEF DESCRIPTION OF THE DRAWINGS

Referring now to the drawings in which like reference numbers represent corresponding parts throughout:

FIGS. 6a, 6b, and 7 illustrate examples of the application of pivot transform rules to input tables to produce transformed output tables in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
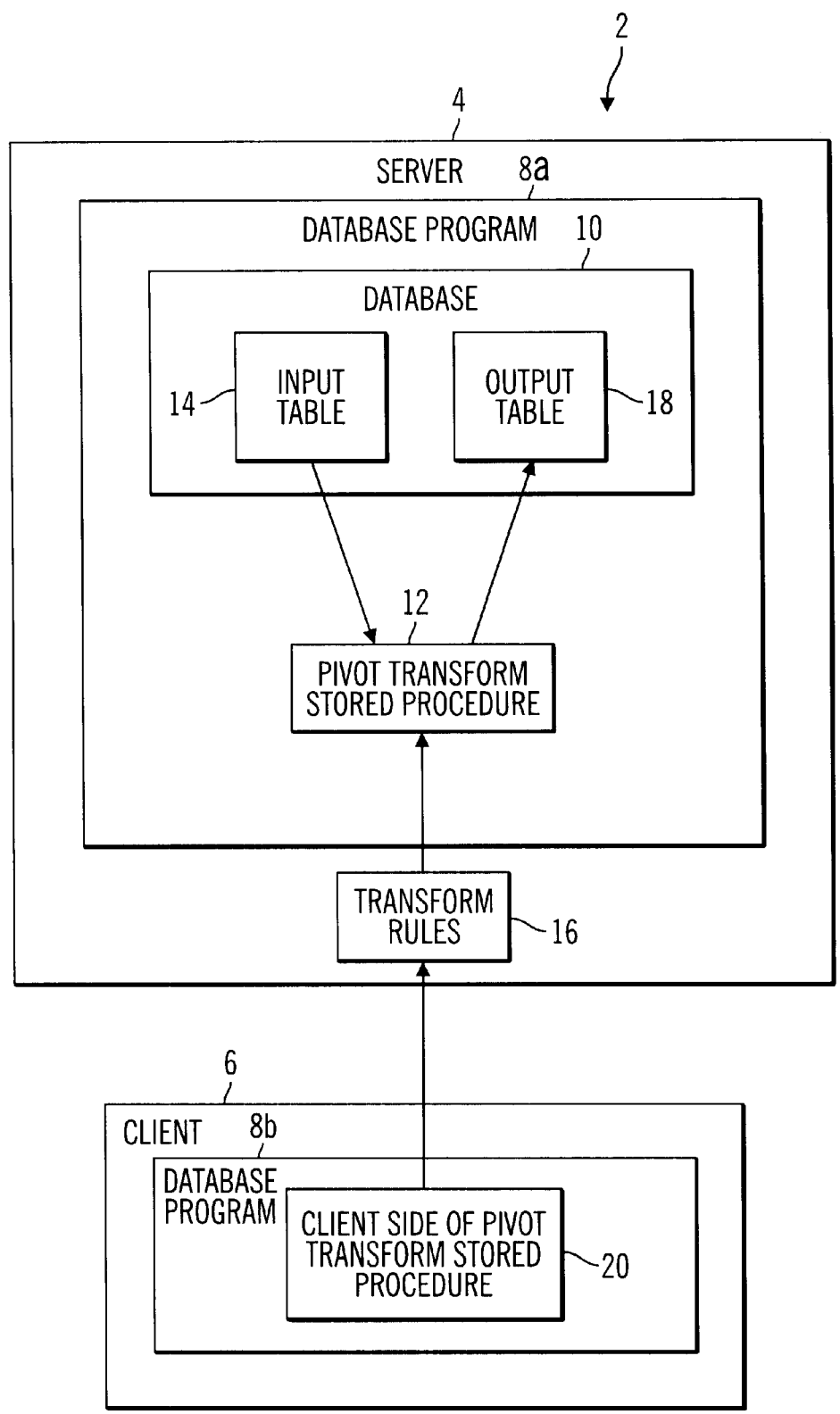
FIG. 1 illustrates a computing environment in which preferred embodiments are implemented.

FIG. 1 illustrates a computing environment 2 in which preferred embodiments are implemented. The environment 2 includes a server 4 and client 6. The server 4 and client 6 would include an operating system, such as MICROSOFT WINDOWS 98 and WINDOWS NT, AIX, OS/390, OS/400, OS/2, and SUN SOLARIS,** and may be comprised of any suitable server and client architecture known in the art. The server 4 and client 6 include a database program 8a and 8b, wherein 8a comprises the server 4 side of the database program and 8b comprises the client 6 side. The server 4 and client 6 may communicate via any communication means known in the art, such as a telephone line, dedicated cable or network line, etc, using any protocol known in the art including TCP/IP network (e.g., an Intranet, the Internet), LAN, Ethernet, WAN, System Area Network (SAN), Token Ring, etc. Alternatively, there may be separate and different networks between the servers 4 and client 6.

The client/server database programs 8a, b, may be comprised of any client/server database program known in the art, such as DB2, Oracle Corporation's ORACLE 8, and Microsoft SQL Server,** etc. The database programs 8a and 8b are used to access operations and perform operations with respect to information maintained in one or more databases 10. The database(s) 10 would consist of multiple tables having rows and columns of data, e.g., tables 14 and 18. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

In preferred embodiments, the pivot transform program is implemented using the IBM stored procedure database program structure. A stored procedure is a block of procedural constructs and embedded SQL statements, i.e., an application program, that is stored in a database and can be called by name. Stored procedures allow an application program to execute in two parts. One part runs on the client and the other on the server. This allows one client call to produce several accesses of the database from the application program executing on the system, i.e., server including the database. Stored procedures are particularly useful to process a large number of database records, e.g., millions to billions of records, without having to transfer data between the server 4 and client 6. The client stored procedure passes input information to the server stored procedure which then, executing within the database program 8 including the database 10, processes numerous database records according to such client input information. The server stored procedure program is initiated by the client, and during execution the client cannot communicate with the stored procedure executing in the server. Further details of stored procedures are described in the publication "A Complete Guide to DB2 Universal Database," "A Complete Guide to DB2 Universal Database," which was incorporated by reference above.

The pivot transform of the preferred embodiments is implemented as a stored procedure application program 12 in the server 4. The pivot transform stored procedure 12 receives as input a name of an input table 14 from the database 10, and transform rules 16 from the client 6 specifying the pivot operations to perform on columns in the named input table 14. The results of the pivot operations performed by the pivot transform stored procedure 12 in response to the transform rules 16 are generated into the output table 18. The client side of the pivot transform stored procedure 20 generates the transform rules 16 that specify the pivot operations to perform and initiate execution of the pivot transform stored procedure 12.

In preferred embodiments, the client side 8b can pass parameters to the pivot transform stored procedure 12 as "host variables" or embedded in a CALL statement. In either case, the parameters or transform rules 16 must be specified to control the operation of the pivot transform 12.

Structure and Operation of the Pivot Transform

A graphical user interface (GUI) at the client 6 may be used to enter various input parameters to control a pivot operation. In response to such user input, the client side 20 would generate an application program interface (API) call to the pivot transform stored procedure 12 including the parameters shown in FIG. 2 to initiate and control the operation of the pivot transform stored procedure 12. The pivot parameter fields 50 shown in FIG. 2 includes an input table name 52, output table name 54, log table name 56, run ID 58, carry over columns 60, data column names 62, pivot columns 64, and a sequential number column 66.

A pivot operation allows a user to aggregate groups of columns into a single column spanning the same number of rows as there are columns in the group. The data in the columns selected for pivot are of the same or a promotable data type. "Promotable" means that the data type appears in the promotion path of the data type of the column. A promotion type may comprise: small integer to integer to decimal to real to double; character to variable character to long variable character to character large object; graphic to variable graphic to long variable graphic to double byte character large object; etc.

Figure 3:
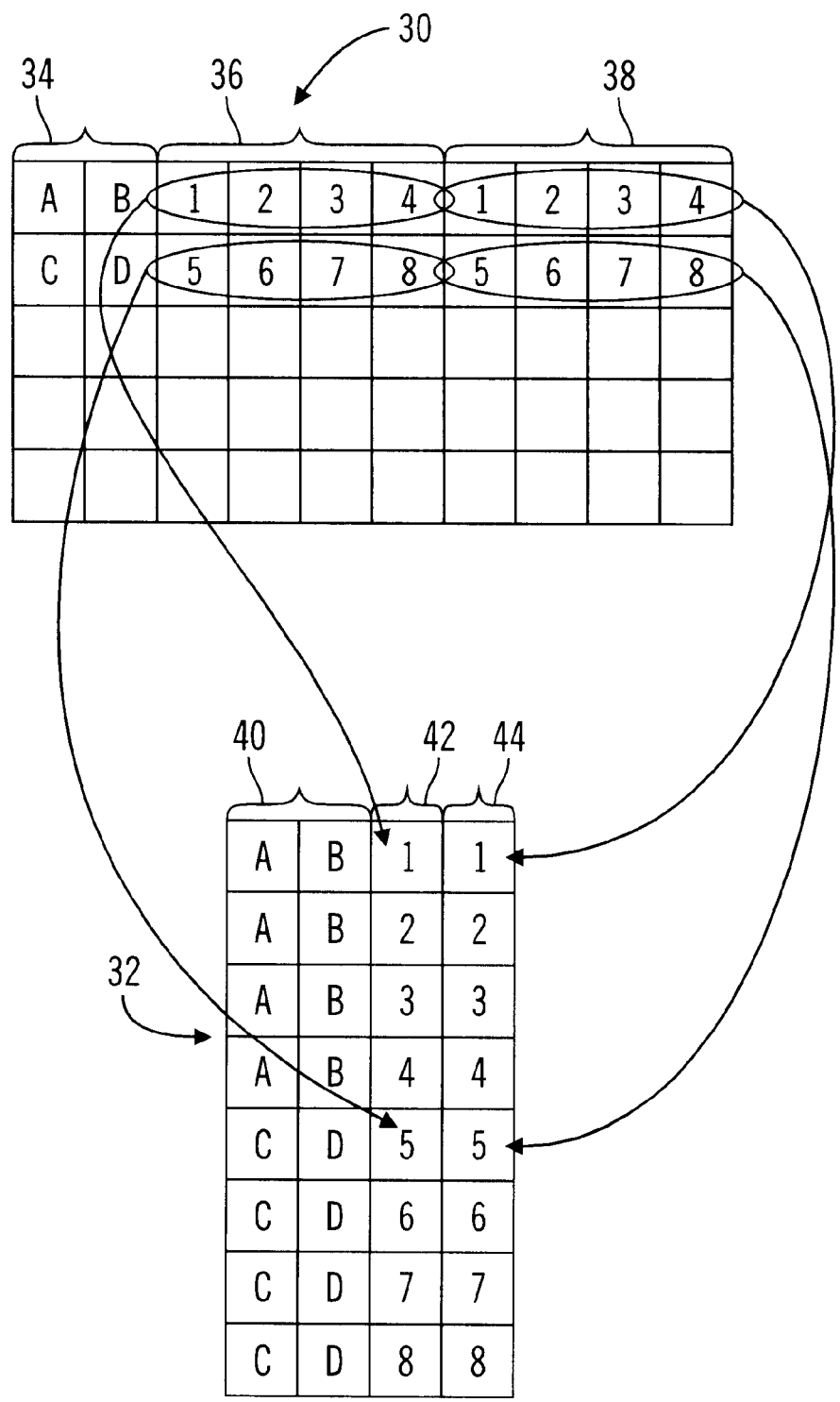
FIGS. 3 illustrates an example of how a table may be pivot transformed in accordance with preferred embodiments of the present invention.

FIG. 3 illustrates an example of a pivot operation on input table 30 to yield output table 32. The first and second columns 34 of the input table carry into the output table 32. The four columns 36 and subsequent four columns 38 form two pivot groups, each having four columns. The pivot transform program 12 generates an output table 32 having columns for the two carry over columns 40 and two pivot columns 42, 44 for each of the two pivot groups 36, 38. The pivot transform program 12, for each row in the input table 30, creates a row in the output table for each column in the pivot groups, i.e., four rows of pivot columns for every row in the input table. In this way, every field in pivot groups 36 and 38 and rows are transformed into one pivot group column 42 and 44 in the output table 32, respectively.

Figure 2:
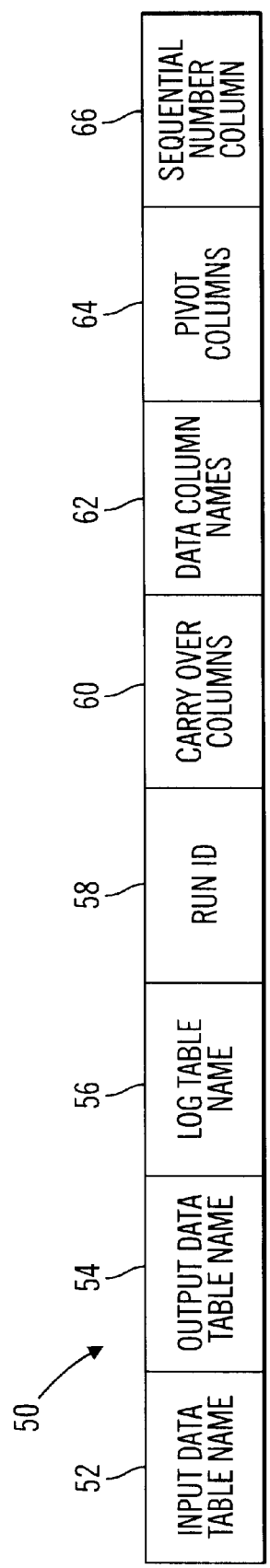
FIG. 2 illustrates the parameters used in a transform command to pivot the columns of an input table in accordance with preferred embodiments of the present invention.

With respect to the parameters 50 shown in FIG. 2, the input table name 52 specifies the input table 14 table including the columns subject to the pivot operations and the output table name 54 specifies the output table 18 where the pivoted columns from the input table 14 are placed. The log table name 56 indicates the name of a log file into which warnings and exceptions that occur during execution of the pivot transform stored procedure 12 are stored. The run ID 58 appears in the log file and is used to identify the pivot transform operations for which the log entry was made. The carry over columns 60 identifies at least one input column from the input table 14 and output columns in the output table 18. The carry over column parameter includes a first field indicating the name of the column and another field indicating the actual column number. In the example of FIG. 3, the carry over columns are columns 34 in the input table 30. This name/column pair of information is included for each carry over column. The carry over columns are not transferred to a single column as with the pivot columns, but are instead copied to the output table in the same column/row arrangement as they were prior to the transformation.

The data column names 62 provides an output column into which input column names are pivoted. If only one name field is included in the data column names 62 parameter, than all the column names in the input table 14 following the carry over columns are pivoted into the data column in the output table, which follows the carry over columns. This is useful when the number of columns in the input table is not known in advance, and all the column names in the input table are to be pivoted into the single data column having a name indicated in the only field in the data column names parameter 62. If more than one name is specified in the data column names parameter 62, then the second through n names are entered into the data column. This allows the user to specify names or values for the data column in the output table 18 following the carry over columns.

The pivot columns 64 provides the pivot groups, including the columns in the input table 14 for each pivot group, that are transferred to a single pivot column in the output table 18. If there are multiple pivot groups, each pivot group is separated by a semi-colon (";"). The first field in a pivot group indicates the column name of the pivot group, which becomes the name of a pivot group column in the output table 18. The second through n fields in a pivot group are the input table 14 columns in the pivot group pivoted into the single column in the output table 18 having the column name indicated in the first field for the pivot group. In preferred embodiments, each pivot group has the same number of columns, which is also the same as the number of fields in the data name column. In the example of FIG. 3, the columns form two pivot groups 36 and 38, which are each transferred to the single pivot columns 42 and 44 in the output table 32. If the pivot columns parameter 64 has only one field, then only one pivot group column is created in the output table 18. Every column field in the input table 14 following the carry over and data columns is pivoted into a single pivot column in the output table 18.

The sequential number count 66 is the name of the column in output table 18 containing sequential number starting at one (1) for each row transferred into the output table 18. This parameter will specify the name of the column including a monotonically increasing number for each row in the output table, and an indicator whether the sequence numbers are ascending or descending.

Figure 4A:
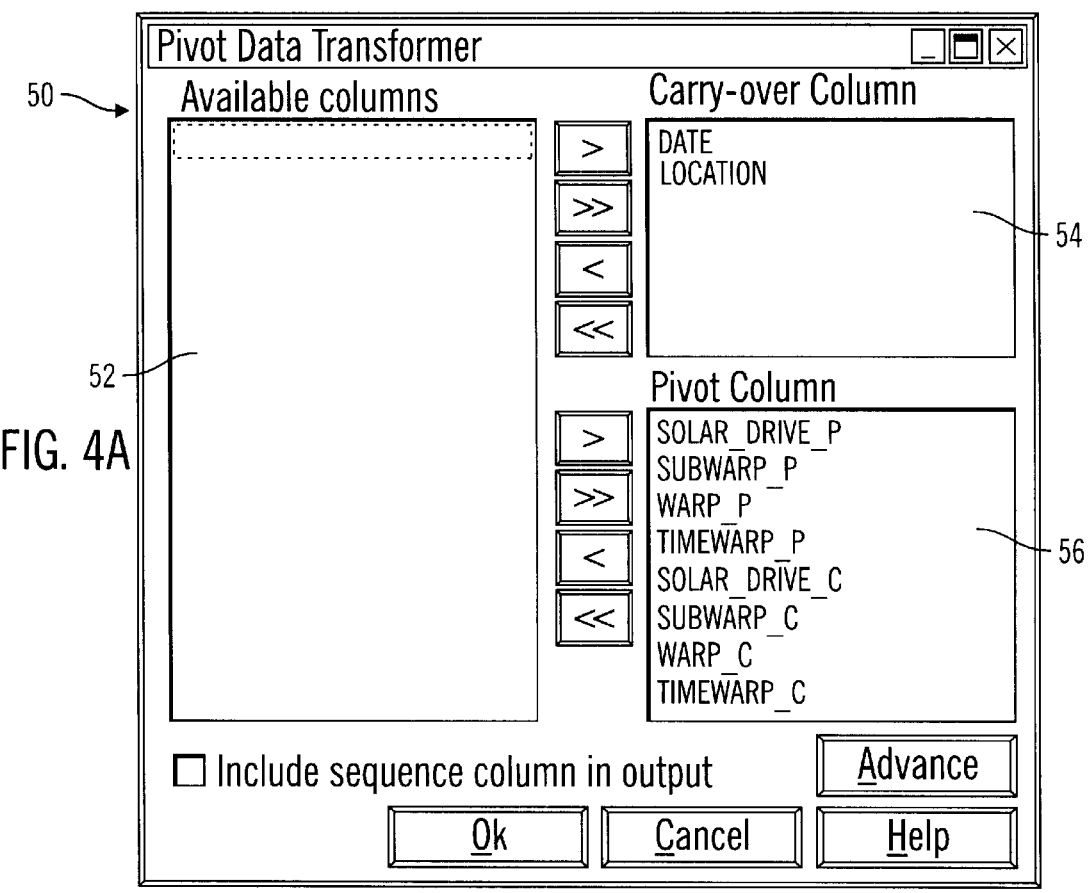
FIGS. 4a and 4b illustrate graphical user interfaces (GUI) panels for entering pivot transform rules in accordance with preferred embodiments of the present invention.
Figure 4B:
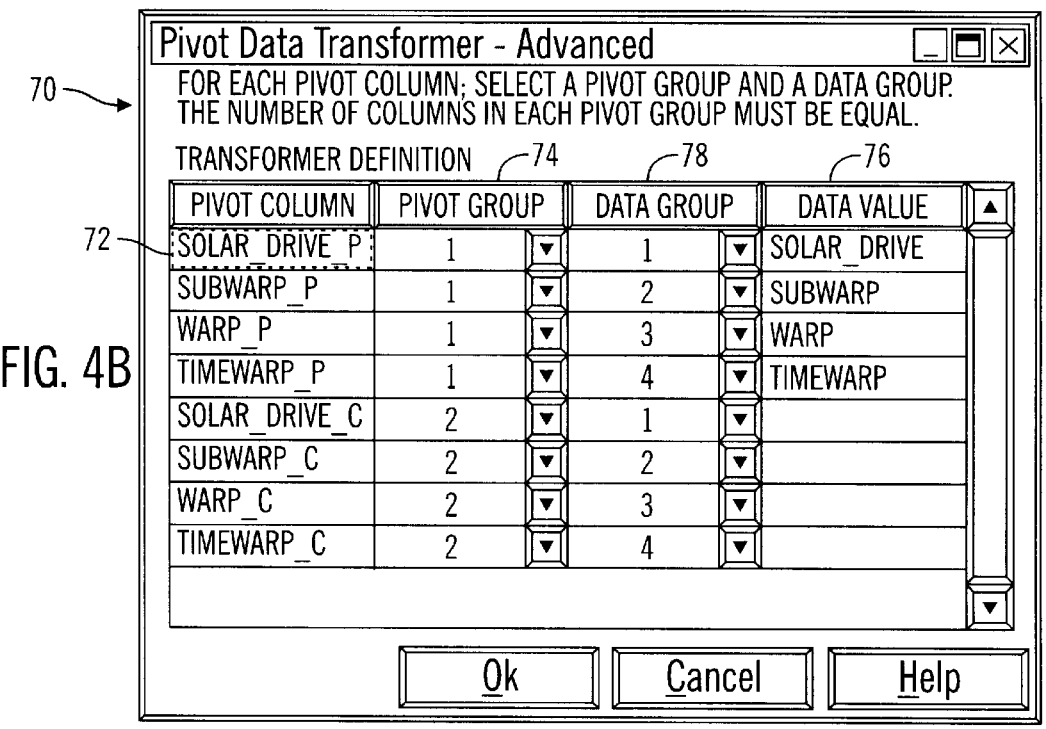

As discussed the user may enter the parameter information through a graphical user interface (GUI) displayed at the client 6. FIGS. 4a and 4b illustrate GUI panels 50 and 70 for allowing the user to select the parameters 50 used to construct a rule 16. The available columns box 52 would display all available columns in the input data table. The user would highlight an available column (not shown) and then select one of the displayed columns to add to the carry over box 54 or the pivot box 56 column. The selected columns in the carry over box 54 would specify the values for the carry over columns 60 parameter and the selected columns entered into the pivot columns box 56 would provide the values for the pivot columns 64 parameter. FIG. 4b provides another screen to allow the user to associate the input table pivot columns 72, identified by name, with user selected pivot groups 74. Each column in the pivot group is pivoted into the same single column in the output table. The user may also specify data column names shown as data values 76 and a data group number 78 for each data value. This data group number associates a data column name with one of the columns in each pivot group. The column names in box 76 are used in the data fields of the data column. Based on the values entered in the GUI panels 50 and 70, the client side of the pivot transform 20 would generate the transform rules 16.

Figure 5A:
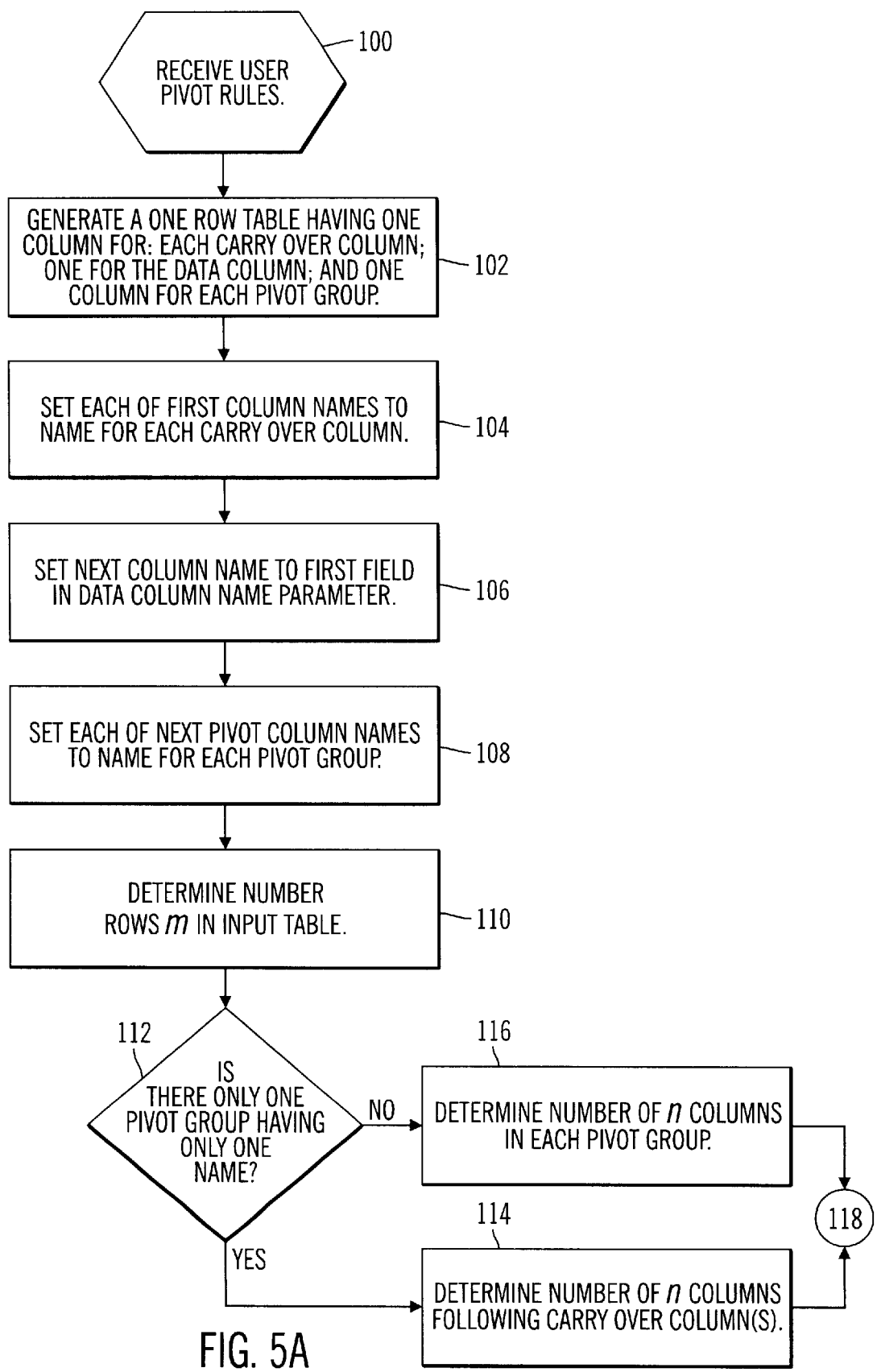
FIGS. 5a and 5b illustrate logic to perform a pivot transform operation in accordance with preferred embodiments of the present invention.

FIGS. 5a, b illustrate logic implemented in the pivot transform stored procedure 12 to process the transform rules 16 including the user set parameters 50 to pivot one or more multiple columns in the input table having the input table name 52 to the output table having the output table name 54. Control begins at block 100 with the pivot transform 12 receiving client generated pivot transform rules 16. The pivot transform 12 then generates (at block 102) a one row table having one column for: each carry over column indicated in the carry over columns 60 parameter; the data column defined in the data column names 60 parameter; and each separate pivot group indicated in the pivot columns 64 parameter. Because each pivot group in the pivot columns 64 parameter is delimited by a ";", the number of pivot columns equals one plus the number of semicolons in the pivot columns 64 parameter. The pivot transform 12 then sets: each of the first column names in the output table 18 to the name for each carry over column (at block 106); the name of the data column following the carry over columns to the first field in the data column names parameter 62 (at block 106); and each of the next pivot column names to the name for each of the pivot groups indicated in first field in each pivot group in the pivot columns parameter 64 (at block 108). The pivot group name is the first field in each pivot group in the parameter 64.

Figure 5B:
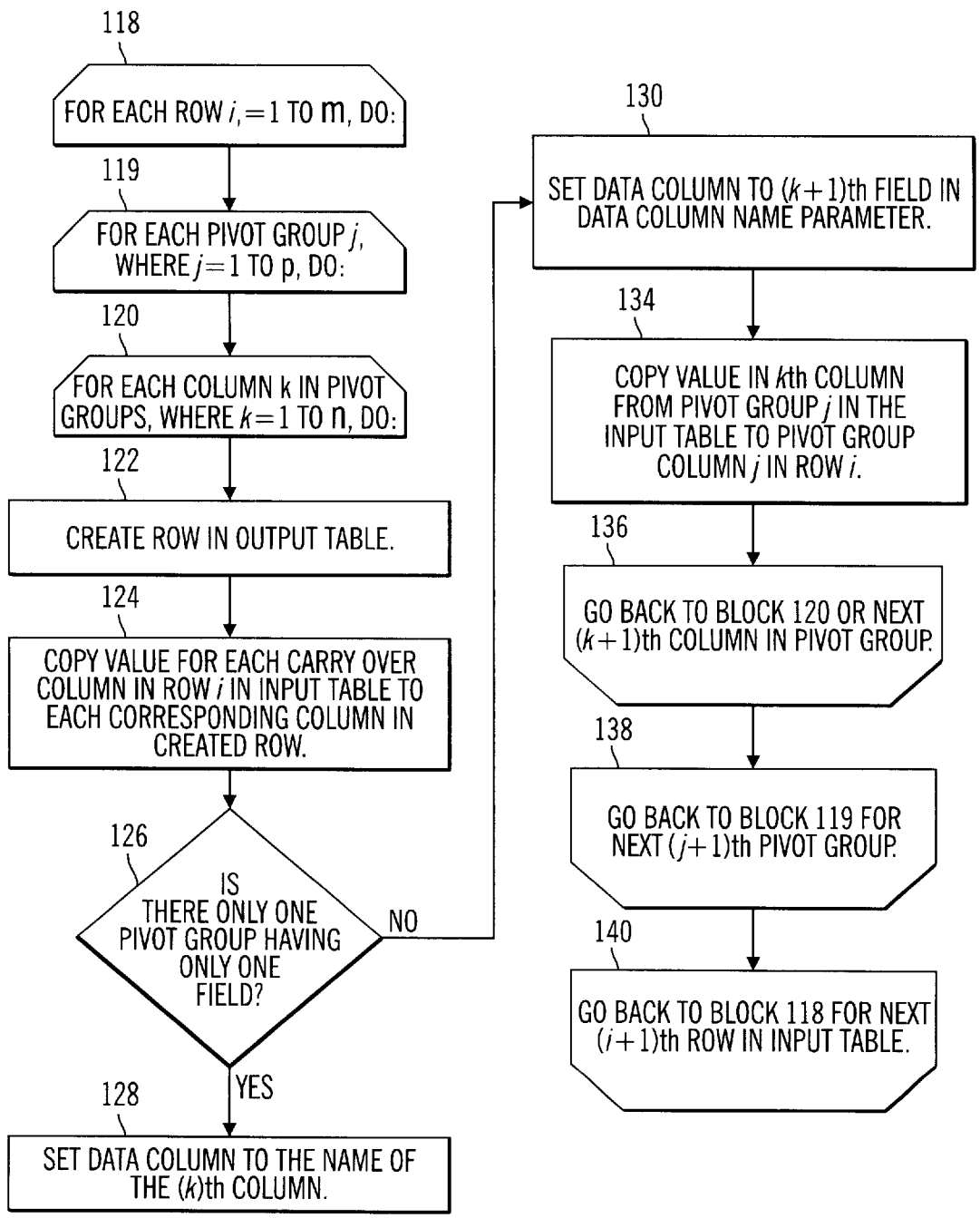

The pivot transform 12 determines the number of m rows in the input table 14 (at block 110) and then determines (at block 112) from the pivot columns parameter 64 whether there is only one pivot group having only one field. If so, the pivot transform 12 determines (at block 114) the number of n columns in the input table 14 following the carry over column(s). Otherwise, the pivot transform 12 determines from the pivot column parameter 64 the number of n columns in the input table 14 aggregated into each of the pivot groups. As discussed, each pivot group aggregates the same number of columns in the input table 14, which is also equal to the number of fields in the data column names parameter 62 following the first field. From block 114 or 116 control proceeds to block 118 in FIG. 5b to copy values from the input table 14 to the output table 18 to accomplish the pivot transform specified in the transform rules 16.

Block 118 begins an outer loop iterating for each of the m rows in the input table 14. Block 119 is a first inner loop with respect to the outer loop at block 118 iterating for each j pivot group indicated in the pivot columns 64 parameter, where p is the number of pivot groups, or number of fields separated by semicolons. In the case of only one field in the pivot columns 64 and data column names 62 parameters, p equals one and the loop at block 119 makes only one iteration. Block 120 is a second inner loop having as an outer loop the first inner loop at block 119, and iterating for each of the n columns aggregated in each pivot group. As discussed, if each pivot group aggregates multiple columns, then n is equal to the number of fields in the pivot columns parameter 64 for each pivot group, following the first field in each group. If a pivot column 64 parameter has only one field, then the number of columns n equals the number of columns in the input table 14 following the carry over columns. Within the inner loop at block 120, the pivot transform 16 begins by creating (at block 122) a row in the output table 18. The pivot transform 12 then copies (at block 124) the value for each carry over column in row i in the input table 14 to the first columns in the created row of the output table 18, as the first columns hold the carry over values.

The pivot transform 12 determines (at block 126) whether the pivot columns 64 parameter has only one pivot group having only one field; alternatively a determination can be made whether there is only one filed in the data column names 62 parameter. If there is only one field in the pivot columns 64 and data column names 62 parameter, then the pivot transform 12 sets (at block 128) the field in the data column to the name of the kth column of the input table 14. Otherwise, the data column field is set (at block 130) to the (k+1)th field in the data column names parameter 62. The (k+1)th value is used because the first field in the data column names parameter 62 has the name of the data column. The pivot transform 12 then copies (at block 134) the value in the kth column from pivot group j in the input table 14 to pivot group column j in the created row The actual column in the input table 14 copied would be the column number equal to (the number of carry over columns plus one (for the data column) plus (j−1)*k (for all pivot group columns prior to the current pivot group j) plus k (the current column in the current pivot group j)).

The pivot transform 12 loops (at block 136) back to block 120 to perform another iteration for the next (k+1)th column in the pivot groups. After considering all n columns in each pivot group, the pivot transform loops (at block 138) back to block 119 to perform another iteration for the next (j+1)th pivot group. After considering all pivot groups, the pivot transform 12 loops back to block 118 to process the next (i+1)th row in the input table 14.

If a sequence number parameter 66 was specified, then an additional column would be generated into the output table 18 indicating a monotonically increasing sequence number for each row in the output table.

Preferred embodiments provide a command data structure to control a stored procedure program to pivot columns of data in an input table 14 in the database 10. The pivot rules may indicate multiple aggregates of columns to pivot into one output table 18 column for each aggregate. This allows a single instance of execution of the transform program to pivot all the columns in the input table 14. Preferred embodiments thus provide a flexible and programmable data structure and program to provide fine grained control of pivot operations. Further, with preferred embodiments, the client 6 does not increase network traffic to perform the pivot operations because the client does not transfer the input 14 and output 18 tables between the database server 4 and client 6. Instead, the client 6 merely provides a command data structure including various parameters and rules to a stored procedure 12 that executes in the server 4 to perform the pivot operations within the database program 8 on the server 4. Such savings in network traffic can be significant when very large database tables, including millions or billions, of records are pivot transformed.

Figure 6A:
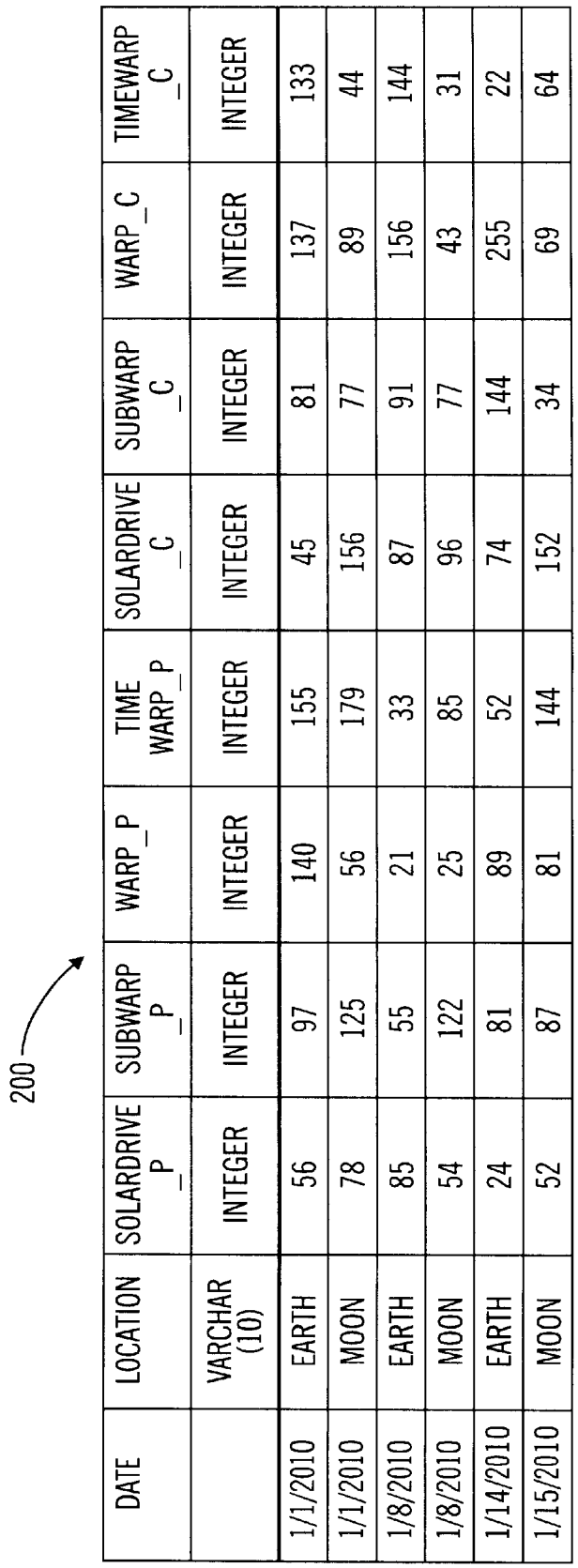

FIGS. 6a, b and 7 illustrate examples of input tables and the output pivoted tables. FIG. 6a shows an input table 200 that has records of craft landings by location of landing, i.e., earth or the moon, and date. The columns of the input table include a column for each possible landing craft, which includes craft types SolarDrive, Warp, SubWarp, TimeWarp for passengers (P) and cargo (C). Each record provides, for each date and location, the number of landings for each of the possible eight space craft, having the names indicated in the column names following the location column. Assume the user set the following parameters 50 of a pivot transform to apply to the input table 200:

Carry over columns: date, location;
Data column names: "Craft", SolarDrive, Warp, SubWarp, TimeWarp
Pivot Columns: "Passenger," SolarDrive_P, SubWarp_P, Warp_P, TimeWarp_P;
"Cargo," SolarDrive_C, SubWarp_C, Warp_C, TimeWarp_C;

The pivot transform 12 would, according to the logic if FIGS. 5a, b and the above rules, generate the output table 202 in FIG. 6b. The pivot transform 12 would first generate (at block 102) a 5 column table, two columns for the two carry over columns, a "craft" column for the data column, and two pivot columns, named Passenger and Cargo, for the two pivot groups, having the names "Passenger" and "Cargo" in the first field of each of the two pivot groups. The pivot transform 12 would determine (at block 116) that there are four columns (n) in each pivot group, one for each spacecraft type identified in the data column names, and six rows (m) in the input table 200.

The pivot transform 12 would then take a row from the input table 200, and generate 4 (n) rows in the output table 202 for each row in the input table. Each four rows in the output table 202 would include: the same carryover date and location columns (at block 124); a different data column field for the four data column names indicating a spacecraft type, shown in the Craft column of the output table 202 (at block 130); and a separate Passenger and Cargo column for the different values in row i (at block 134). In this way, the pivot rules specify to create an output table including records for each date and location indicating a spacecraft type in the data column, and the number of passenger and cargo landings in the passenger and cargo pivot group columns, respectively. The passenger and cargo columns in the output table 202, for each row, aggregate four pivot columns in the input table 200.

The output table 202 is more amenable to column functions performed on the craft landings by passenger and cargo. This allows a user to use general column functions to analyze craft landings by passenger and cargo craft types. If the user could not perform the transform, then the SQL statements needed to perform statistical analysis on craft landings by passenger or cargo crafts would be substantially complex as they would have to apply to fields across columns in the same row. Thus, the pivot transform applied to input table 200 allows the user to transform the input table 200 to produce an output table 202 particularly suitable for column functions on aggregates of spacecraft fields from the input table.

FIG. 7 illustrates input 220 and output 222 tables subject to a pivot transform in the situation where the pivot columns parameter 64 has only one pivot group with one field name and the data column names parameter 62 has only one field. Below are some of the parameters for the rules to accomplish the transform from input table 220 to output table 222.

Carry Over Columns: Date
Data Column Names: "Cashier"
Pivot Columns: "Value"
Sequential Number Column: ORDER The pivot transform 12 would, according to the logic if FIGS. 5a, b and the above rules, generate the output table 222 from input table 220. The pivot transform 12 would first (at block 102) generate a four column output table, one column for the one carry over column "Date," a "Cashier" column for the data column, and one pivot column as there is only one pivot group "Value." The pivot transform 12 would determine (at block 114) that the number of columns (n) as the number of columns following the carry over column is four, one for each cashier. The pivot transform 12 would further determine (at block 112) that there are three rows (m) in the input table 220.

The pivot transform 12 would then take a row from the input table 200, and generate 4 (n) rows in the output table 222 for each row in the input table 200. Each four rows in the output table 222 would include: the same carryover date column value for row i (at block 124); one of the four cashier names indicated in the column names for the columns following the carry over column (at block 128); and the number of cashier transactions for row i for one of the k cashiers (at block 134). In this way, the pivot rules generate an output table 222 that has for each row, a date, one Cashier name field indicating the name of an employee operating the cash register and a Value column indicating the number of transactions for the cashier indicated in the Cashier column on the date indicated in the date column. The above pivot transform is particularly useful to transform the input table 220 to a format where column functions can be performed on transactions across cashiers.

Further, the pivot transform applied to input table 220 is particularly useful when a business generates a spreadsheet and adds a column for each employee and a value for the employee, such as cash register transactions for employees. Businesses often generate such spreadsheets having very wide rows as they add new columns to the row for each new instance. The pivot transform where there is only one field in the pivot 64 and data column 62 parameters is useful to aggregate all columns in a single column in the output table. This allows the user to then perform basic column functions, e.g., standard deviation, sum, average, minimum, maximum, etc., on the single transformed column to analyze the cashier transaction data in the input table that was previously spread across numerous columns.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to specific data structures, such as a rule table having columns of rules, and an arrangement of parameters to provide a vehicle for transferring commands to the pivot transform stored procedure program. However, those skilled in the art will recognize that modifications may be made to the architecture of the data structures used to convey pivot transform rules and still remain within the scope of the present invention.

Preferred embodiments were described with respect to specific pivot operations to groups of aggregated columns into one or more columns in the output table. In further embodiments, other types of rules may be provided and included in the command data structure of the preferred embodiments to perform different types of pivot operations to pivot data from the input to the output table.

In preferred embodiments, the pivot transform program was executed in a stored procedure type program, such as that used in the IBM DB2 database system. However, in further embodiments, different types of application programs, other than stored procedure programs, may be executed in the server 4 or even the client 6 to perform pivot operations in accordance with the command data structures of the preferred embodiments.

In preferred embodiments, the input table and output table were included in a database in the server in which the pivot transform program is executing. In alternative embodiments, the rules, input table, and output table may be distributed at different storage locations at different network devices.

In preferred embodiments, a client constructed the pivot operation command and communicated such commands to the database server. In alternative embodiments, the pivot operation command of the preferred embodiments may be executed on the machine used to construct the command.

In summary, preferred embodiments disclose a method, system, program, and data structure for transforming at least one column in an input table. An input data table has multiple columns and rows. A determination is made of multiple data column names and multiple pivot columns in the input table. A row is generated in an output table for each data column name, having one data column name field including one data column name and at least one pivot column field including the value in one pivot column field in the input table, wherein each of the rows in the output table for each data column name has different values in at least one of the data column name field and pivot column field.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transforming at least two columns in an input table, comprising:

determining an input data table comprised of multiple columns and rows;

determining multiple data column names;

determining multiple pivot columns in the input table; and generating a row in an output table for each data column name and for each pivot column value in each pivot column, having one data column name field including one data column name and at least one pivot column field including the value in one pivot column in the input table, wherein each of the rows in the output table for each data column name has different values in at least one of the data column name field and pivot column field.

2. The method of claim 1, wherein each pivot column field in one row in the input table is copied to one pivot column field in one row in the output table, thereby transferring fields in multiple pivot columns in the input table to one pivot column in multiple rows in the output table.

3. The method of claim 2, wherein one row for each data column name and pivot column field is generated in the output table for each row in the input table.

4. The method of claim 2, further comprising determining at least one carry over column in the input table, wherein the rows in the input table have different values in at least one carry over column, and wherein one row for each data column name is generated in the output table for each row in the input table such that the rows generated for one row in the input table have the same values in the at least one carry over column field and different values in the data column name field and the at least one pivot column field.

5. The method of claim 1, wherein for each pivot column field in the input table there is one row in the output table having one data column name field and pivot column field including the pivot column name and corresponding pivot column value in the input table, respectively.

6. The method of claim 1, wherein determining multiple pivot columns in the input table comprises determining at least one pivot group including at least one pivot column in the input table, wherein generating the at least one pivot column field in the output table row comprises generating a pivot group column in the output table row for each pivot group, wherein each pivot group column in the output table includes a value in one of the pivot column fields in the pivot group in the input table, thereby aggregating the input table pivot columns into one pivot group in one pivot group column in the output table.

7. The method of claim 6, further comprising determining at least one carry over column in the input table, wherein each row in the input table has a different value in at least one carry over column, and wherein one row is generated in the output table for each possible data column name and input table row combination, such that the rows generated for one row in the input table have the same values in the at least one carry over column field and different values in the data column name field and the at least one pivot group column field.

8. The method of claim 6, wherein pivot columns in one pivot group in the input table are of the same data type.

9. The method of claim 6, wherein the number of data column names and pivot columns in each pivot group is the same.

10. A system for transforming at least two columns in an input table, comprising:

means for determining an input data table comprised of multiple columns and rows;

means for determining multiple data column names;

means for determining multiple pivot columns in the input table; and means for generating a row in an output table for each data column name and for each pivot column value in each pivot column, having one data column name field including one data column name and at least one pivot column field including the value in one pivot column in the input table, wherein each of the rows in the output table for each data column name has different values in at least one of the data column name field and pivot column field.

11. The system of claim 10, wherein each pivot column field in one row in the input table is copied to one pivot column field in one row in the output table, thereby transferring fields in multiple pivot columns in the input table to one pivot column in multiple rows in the output table.

12. The system of claim 11, wherein one row for each data column name and pivot column field is generated in the output table for each row in the input table.

13. The system of claim 11, further comprising means for determining at least one carry over column in the input table, wherein the rows in the input table have different values in at least one carry over column, and wherein one row for each data column name is generated in the output table for each row in the input table such that the rows generated for one row in the input table have the same values in the at least one carry over column field and different values in the data column name field and the at least one pivot column field.

14. The system of claim 10, wherein for each pivot column field in the input table there is one row in the output table having one data column name field and pivot column field including the pivot column name and corresponding pivot column value in the input table, respectively.

15. The system of claim 10, wherein determining multiple pivot columns in the input table comprises determining at least one pivot group including at least one pivot column in the input table, wherein generating the at least one pivot column field in the output table row comprises generating a pivot group column in the output table row for each pivot group, wherein each pivot group column in the output table includes a value in one of the pivot column fields in the pivot group in the input table, thereby aggregating the input table pivot columns into one pivot group in one pivot group column in the output table.

16. The system of claim 15, further comprising means for determining at least one carry over column in the input table, wherein each row in the input table has a different value in at least one carry over column, and wherein one row is generated in the output table for each possible data column name and input table row combination, such that the rows generated for one row in the input table have the same values in the at least one carry over column field and different values in the data column name field and the at least one pivot group column field.

17. The system of claim 16, wherein pivot columns in one pivot group in the input table are of the same data type.

18. The system of claim 15, wherein the number of data column names and pivot columns in each pivot group is the same.

19. An article of manufacture for use in transforming at least two columns in an input table, the article of manufacture comprising computer usable media including at least one computer program embedded therein that causes the computer to perform:
  determining an input data table comprised of multiple columns and rows;
  determining multiple data column names;
  determining multiple pivot columns in the input table; and
  generating a row in an output table for each data column name and for each pivot column value in each pivot column, having one data column name field including one data column name and at least one pivot column field including the value in one pivot column in the input table, wherein each of the rows in the output table for each data column name has different values in at least one of the data column name field and pivot column field.

20. The article of manufacture of claim 19, wherein each pivot column field in one row in the input table is copied to one pivot column field in one row in the output table, thereby transferring fields in multiple pivot columns in the input table to one pivot column in multiple rows in the output table.

21. The article of manufacture of claim 20, wherein one row for data column name and pivot column field is generated in the output table for each row in the input table.

22. The article of manufacture of claim 20, further comprising determining at least one carry over column in the input table, wherein the rows in the input table have different values in at least one carry over column, and wherein one row for each data column name is generated in the output table for each row in the input table such that the rows generated for one row in the input table have the same values in the at least one carry over column field and different values in the data column name field and the at least one pivot column field.

23. The article of manufacture of claim 19, wherein for each pivot column field in the input table there is one row in the output table having one data column name field and pivot column field including the pivot column name and corresponding pivot column value in the input table, respectively.

24. The article of manufacture of claim 19, wherein determining multiple pivot columns in the input table comprises determining at least one pivot group including at least one pivot column in the input table, wherein generating the at least one pivot column field in the output table row comprises generating a pivot group column in the output table row for each pivot group, wherein each pivot group column in the output table includes a value in one of the pivot column fields in the pivot group in the input table, thereby aggregating the input table pivot columns into one pivot group in one pivot group column in the output table.

25. The article of manufacture of claim 24, further comprising determining at least one carry over column in the input table, wherein each row in the input table has a different value in at least one carry over column, and wherein one row is generated in the output table for each possible data column name and input table row combination, such that the rows generated for one row in the input table have the same values in the at least one carry over column field and different values in the data column name field and the at least one pivot group column field.

26. The article of manufacture of claim 24, wherein pivot columns in one pivot group in the input table are of the same data type.

27. The article of manufacture of claim 24, wherein the number of data column names and pivot columns in each pivot group is the same.

28. A memory device including a command for performing a pivot operation on a computer database input table, the command comprising
  an input data table name parameter indicating the input table comprised of multiple columns and rows subject to the pivot operation; and
  a data column parameter indicating multiple data column names;
  a pivot column parameter indicating multiple pivot columns in the input table, wherein a row is generated in an output table for each data column name and for each pivot column value in each pivot column, having one data column name field including one data column name and at least one pivot column field including the value in at least one of the pivot column in the input table.

29. The memory of claim 28, further comprising determining a carry over column parameter indicating at least one carry over column in the input table, wherein the rows in the input table have different values in at least one carry over column, and wherein one row for each data column name is generated in the output table for each row in the input table such that the rows generated for one row in the input table have the same values in the at least one carry over column field and different values in the data column name field and the at least one pivot column field.

30. The memory of claim 29, wherein the pivot column parameter indicates at least one pivot group including at least one pivot column in the input table, wherein generating the at least one pivot column field in the output table row comprises generating a pivot group column in the output table row for each pivot group, wherein each pivot group column in the output table includes a value in one of the pivot column fields in the pivot group in the input table, thereby aggregating the input table pivot columns into one pivot group in one pivot group column in the output table.

31. The memory device method of claim 30, wherein pivot columns in one pivot group in the input table are of the same data type.

32. The memory device of claim 30, wherein the number of data column names and pivot columns in each pivot group is the same.

* * * * *